(12) United States Patent
Smalley et al.

(10) Patent No.: US 6,913,789 B2
(45) Date of Patent: Jul. 5, 2005

(54) PROCESS UTILIZING PRE-FORMED CLUSTER CATALYSTS FOR MAKING SINGLE-WALL CARBON NANOTUBES

(75) Inventors: Richard E. Smalley, Houston, TX (US); Robert H. Hauge, Houston, TX (US); Peter Athol Willis, Los Angeles, CA (US); W. Carter Kittrell, Houston, TX (US)

(73) Assignee: William Marsh Rice University, Houston, TX (US)

( * ) Notice: Subject to any disclaimer, the term of this patent is extended or adjusted under 35 U.S.C. 154(b) by 265 days.

(21) Appl. No.: 10/059,570

(22) Filed: Jan. 29, 2002

(65) Prior Publication Data

US 2002/0102203 A1 Aug. 1, 2002

Related U.S. Application Data

(60) Provisional application No. 60/265,646, filed on Jan. 31, 2001, provisional application No. 60/287,894, filed on May 1, 2001, and provisional application No. 60/302,956, filed on Jul. 3, 2001.

(51) Int. Cl.$^7$ .............................................. C23C 16/26
(52) U.S. Cl. ................................. 427/249.1; 427/249.3
(58) Field of Search ........................... 427/249.1, 249.3

(56) References Cited

U.S. PATENT DOCUMENTS

| | | | |
|---|---|---|---|
| 5,358,646 A | | 10/1994 | Gloyna et al. |
| 6,362,011 B1 | * | 3/2002 | Massey et al. ............... 436/526 |
| 6,555,945 B1 | * | 4/2003 | Baughman et al. .......... 310/300 |
| 6,645,455 B2 | * | 11/2003 | Margrave et al. ........ 423/447.1 |
| 6,692,717 B1 | * | 2/2004 | Smalley et al. ......... 423/445 B |

FOREIGN PATENT DOCUMENTS

| | | |
|---|---|---|
| WO | WO 98/05920 | 2/1998 |
| WO | WO 98/39250 | 9/1998 |
| WO | WO 00/26138 | 5/2000 |

OTHER PUBLICATIONS

Nikolaev, et al., "Gas–phase catalytic growth of single-walled carbon nanotubes from carbon monoixde," *Chemical Physics Letters*, vol. 313, Nov. 5, 1999, pp. 91–97.

Bronikowski, et al., "Gas–phase production of carbon single–walled nanotubes from carbon monoxide via the HiPco process: A parametric study," *J. Vac. Sci. Technol. A*, vol. 19. No. 4, Jul./Aug. 2001, pp. 1800–1805.

Dai, et al., "Single–wall nanotubes produced by metal catalyzed disproportionation of carbon monoxide," *Chemical Physics Letter*, vol. 260, Sep. 27, 1996, pp. 471–475.

Dresselhaus, et al., "C60–Related Tubules and Spherules," *Science of Fullerences and Carbon Nanotubes*, Chapter 19, 1996, pp. 756–869.

* cited by examiner

*Primary Examiner*—Bret Chen
(74) *Attorney, Agent, or Firm*—Ross Spencer Garsson; Edward T. Mickelson; Winstead Sechrest & Minick P.C.

(57) ABSTRACT

A gas-phase method for producing high yields of single-wall carbon nanotubes with high purity and homogeneity is disclosed. The method involves using preformed metal catalyst clusters to initiate and grow single-wall carbon nanotubes. In one embodiment, multi-metallic catalyst precursors are used to facilitate the metal catalyst cluster formation. The catalyst clusters are grown to the desired size before mixing with a carbon-containing feedstock at a temperature and pressure sufficient to initiate and form single-wall carbon nanotubes. The method also involves using small fullerenes and preformed sections of single-wall carbon nanotubes, either derivatized or underivatized, as seed molecules for expediting the growth and increasing the yield of single-wall carbon nanotubes. The multi-metallic catalyst precursors and the seed molecules may be introduced into the reactor by means of a supercritical fluid. In addition the seed molecules may be introduced into the reactor via an aerosol or smoke.

27 Claims, 6 Drawing Sheets

PROCESS UTILIZING PRE-FORMED CLUSTER CATALYSTS FOR MAKING SINGLE-WALL CARBON NANOTUBES

CROSS-REFERENCES TO RELATED APPLICATIONS

This application claims priority from U.S. provisional applications Ser. Nos. 60/265,646, filed Jan. 31, 2001, 60/287,894, filed May 1, 2001, and 60/302,956, filed Jul. 3, 2001, which applications are each incorporated herein by reference.

This patent application is related to U.S. patent application Ser. No. 10/059,871, "PROCESS UTILIZING TWO ZONES FOR MAKING SINGLE-WALL CARBON NANOTUBES," to Smalley et al., filed Jan. 29, 2002, and U.S. patent application Ser. No. 10/059,570, "PROCESS UTILIZING SEEDS FOR MAKING SINGLE-WALL CARBON NANOTUBES," to Smalley et al., filed Jan. 29, 2002. Both of these U.S. patent applications are also incorporated herein by reference.

The present invention was made in connection with research pursuant to grant number NCC9-77 and R51480 from the national Aeronautic and Space Administration grant number 36810 from the National Science Foundation; and grant number 99 003604-1999 and R81710 from the Texas Advanced Technology program.

FIELD OF INVENTION

The present invention relates broadly the field of single-wall carbon nanotubes also known as tubular fullerenes or, commonly "buckytubes." More specifically, the invention relates to the production of single-wall carbon nanotubes in high yield and purity in a continuous process using a metallic catalyst with a carbon-containing feedstock at high temperature and pressure.

BACKGROUND OF THE INVENTION

Fullerenes are spheroidal, closed-cage molecules consisting essentially of $sp^2$-hybridized carbons typically arranged in hexagons and pentagons. Fullerenes, such as $C_{60}$, also known as Buckminsterfullerene, more commonly, "buckyballs," and $C_{70}$, have been produced from vaporized carbon at high temperature. Presence of a transition metal catalyst with the high temperature vaporized carbon results in the formation of single-wall tubular structures which may be sealed at one or both ends with a semifullerene dome. These carbon cylindrical structures, known as single-wall carbon nanotubes or, commonly, "buckytubes" have extraordinary properties, including both electrical and thermal conductivity and high strength.

Nested single-wall carbon cylinders, known as multi-wall carbon nanotubes (MWNTs), possess properties similar to the single wall carbon nanotubes (SWNTs); however, single-wall carbon nanotubes have fewer defects, rendering them stronger, more conductive, and typically more useful than multi-wall carbon nanotubes of similar diameter. SWNTs are believed to be much more free of defects than are MWNTs because MWNTs can survive occasional defects by forming bridges between the unsaturated carbon of the neighboring cylinders, whereas SWNTs have no neighboring walls for defect compensation.

In defining the size and conformation of single-wall carbon nanotubes, the system of nomenclature described by Dresselhaus et al., *Science of Fullerenes and Carbon Nanotubes*, 1996, San Diego: Academic Press, Ch. 19, will be used. Single-wall tubular fullerenes are distinguished from each other by a double index (n, m), where n and m are integers that describe how to cut a single strip of hexagonal graphite such that its edges join seamlessly when the strip is wrapped onto the surface of a cylinder. When n=m, the resultant tube is said to be of the "arm-chair" or (n, n) type, since when the tube is cut perpendicularly to the tube axis, only the sides of the hexagons are exposed and their pattern around the periphery of the tube edge resembles the arm and seat of an arm chair repeated n times. When m=0, the resultant tube is said to be of the "zig zag" or (n,0) type, since when the tube is cut perpendicular to the tube axis, the edge is a zig zag pattern. Where n≠m and m≠0, the resulting tube has chirality. The electronic properties are dependent on the conformation, for example, arm-chair tubes are metallic and have extremely high electrical conductivity. Other tube types are metallic, semi-metals or semi-conductors, depending on their conformation. Regardless of tube type, all single-wall nanotubes have extremely high thermal conductivity and tensile strength.

Several methods of synthesizing fullerenes have developed from the condensation of vaporized carbon at high temperature. Fullerenes, such as $C_{60}$ and $C_{70}$, may be prepared by carbon arc methods using vaporized carbon at high temperature. Carbon nanotubes have also been produced as one of the deposits on the cathode in carbon arc processes.

Single-wall carbon nanotubes have been made in a DC arc discharge apparatus by simultaneously evaporating carbon and a small percentage of Group VIIIb transition metal from the anode of the arc discharge apparatus. These techniques allow production of only a low yield of carbon nanotubes, and the population of carbon nanotubes exhibits significant variations in structure and size.

Another method of producing single-wall carbon nanotubes involves laser vaporization of a graphite substrate doped with transition metal atoms (such as nickel, cobalt, or a mixture thereof) to produce single-wall carbon nanotubes. The single-wall carbon nanotubes produced by this method tend to be formed in clusters, termed "ropes," of about 10 to about 1000 single-wall carbon nanotubes in parallel alignment, held by van der Waals forces in a closely packed triangular lattice. Nanotubes produced by this method vary in structure, although one structure tends to predominate. Although the laser vaporization process produces an improved yield of single-wall carbon nanotubes, the product is still heterogeneous, and the nanotubes tend to be too tangled for many potential uses of these materials. In addition, the laser vaporization of carbon is a high energy process.

Another way to synthesize carbon nanotubes is by catalytic decomposition of a carbon-containing gas by nanometer-scale metal particles supported on a substrate. The carbon feedstock molecules decompose on the particle surface, and the resulting carbon atoms then precipitate as part of a nanotube from one side of the particle. This procedure typically produces imperfect multi-walled carbon nanotubes.

Another method for production of single-wall carbon nanotubes involves the disproportionation of CO to form single-wall carbon nanotubes and $CO_2$ on alumina-supported transition metal particles comprising Mo, Fe, Ni, Co, or mixtures thereof. This method uses inexpensive feedstocks in a moderate temperature process. However, the yield is limited due to rapid surrounding of the catalyst particles by a dense tangle of single-wall carbon nanotubes, which acts as a barrier to diffusion of the feedstock gas to the catalyst surface, limiting further nanotube growth.

Control of ferrocene/benzene partial pressures and addition of thiophene as a catalyst promoter in an all gas phase process can produce single-wall carbon nanotubes. However, this method suffers from simultaneous production of multi-wall carbon nanotubes, amorphous carbon, and other products of hydrocarbon pyrolysis under the high temperature conditions necessary to produce high quality single-wall carbon nanotubes.

More recently, a method for producing single-wall carbon nanotubes has been reported that uses high pressure CO as the carbon feedstock and a gaseous transition metal catalyst precursor as the catalyst. ("Gas Phase Nucleation and Growth of Single-Wall Carbon Nanotubes from High Pressure Carbon Monoxide," International Pat. Publ. WO 00/26138, published May 11, 2000, incorporated by reference herein in its entirety). This method possesses many advantages over other earlier methods. For example, the method can be done continuously, and it has the potential for scale-up to produce commercial quantities of single-wall carbon nanotubes. Another significant advantage of this method is its effectiveness in making single-wall carbon nanotubes without simultaneously making multi-wall nanotubes. Furthermore, the method produces single-wall carbon nanotubes in high purity, such that less than about 10 wt % of the carbon in the solid product is attributable to other carbon-containing species, which includes both graphitic and amorphous carbon.

While the method has several advantages over prior methods, there are still several aspects of the invention that have room for improvement. One is catalyst productivity, which directly affects both product purity and process economics. Another area for improvement is that of nanotube conformation homogeneity. "Conformation" means the particular diameter and chirality of the nanotube, as indicated by the (n,m) designation, e.g. the (10,10) tube. It would be useful to be able to produce single wall carbon nanotubes with the diameter and chirality best suited for a particular application.

Therefore, considering the foregoing, a need remains for improved methods of producing single-wall carbon nanotubes, with very high purity and homogeneity.

SUMMARY OF THE INVENTION

This invention relates to a method of producing single-wall carbon nanotubes of high purity and homogeneity at high catalyst yield. In the reaction of this method, single-wall carbon nanotubes are produced in a reaction zone at high temperature and pressure. The carbon source for the single-wall carbon nanotubes is a carbon-containing feedstock gas, such as a hydrocarbon, carbon monoxide (CO), or a combination thereof, is introduced in one stream into the reaction zone. Prior to introduction into the reaction zone, the carbon-containing feedstock gas is heated to a temperature, which after mixing with any catalyst containing streams, is sufficient for the initiation and growth of single-wall carbon nanotubes. Transition metal-containing compounds, which serve as catalyst precursors, can be introduced in a separate carrier gas stream into the reactor. The carrier gas may comprise feedstock gas and other non-reactive species. Prior to introduction into the reaction zone, the catalyst precursor molecules are kept under conditions (such as temperature, pressure and carrier gas mixture) where they are stable. Upon entering the reaction zone, the catalyst precursors undergo chemical processes such as dissociation and subsequent reactions of the dissociated fragments, forming metal-containing clusters that serve as catalysts for the formation of single-wall carbon nanotubes in the reaction zone.

The chemical processes in which the catalyst precursors participate may be initiated by their interaction with the feedstock gas in the reaction zone. This interaction may be chemical (e.g. direct chemical reaction between the catalyst precursor and one or more components of the feedstock gas), physical (e.g. thermal heating by mixing with feedstock gas at an elevated temperature) or a combination thereof. Additional means for initiating the chemical processes in which the catalyst precursor reacts to form active catalyst may also be introduced in the reaction zone, such as introduction of additional reagents, application of heat to the reactor vessel in the region where the catalyst precursor is introduced, introduction of high energy electromagnetic excitation, and combinations thereof. The transition metal-containing compounds may be mono-metallic, multi-metallic or mixtures of both, and include one or more elements selected from the group consisting of the Group VIb elements (chromium, molybdenum, and tungsten) and the Group VIIb elements (iron, nickle, cobalt, ruthenium, rhenium, palladium, osmium, iridium, and platinum). The term "multi-metallic" includes compounds containing one or more metal atoms wherein the metal atoms may be the same or different.

In embodiments of this invention, control and enhancement of the single-wall carbon nanotube homogeneity and yield are accomplished by several means. One means is by providing uniform catalyst clusters in a size range conducive for the growth of single-wall carbon nanotubes. "Catalyst cluster" means an agglomeration of atoms that serve as a catalyst for the production of single-wall carbon nanotubes. The catalyst cluster contains at least one transition metal atom and generally, transition metal atoms make up more than 50 atom % of the cluster. Another means is by providing "seed molecules" or "templates" for further growth of single-wall carbon nanotubes.

In one embodiment of this invention, control of the catalyst cluster population and clustering dynamics is achieved with the use of multi-metallic precursor compounds. These multi-metallic catalyst precursors may be used alone or combination with monometallic precursors. The use of multi-metallic catalyst precursors facilitates the nucleation phase of cluster formation. The multi-metallic precursors have several properties that enable faster, more reproducible and stable clustering. First, multi-metallic catalyst precursors may themselves contain metal-metal bonds that would otherwise need to be formed by random collision of two or more mono-metallic catalyst precursors. Second, in the cluster growth process, multi-metallic precursors have larger cross-sectional areas than mono-metallic species, thus enhancing the probability of collisions and clustering. Third, since the multi-metallic catalyst precursors may already contain at least one formed metal-metal bond, there is a higher probability of a colliding metal atom sticking and adding to the cluster because of the possibility of forming more than one metal-metal bond with the atoms in the larger catalyst cluster. Fourth, multi-metallic precursors, and catalyst clusters derived from them, are more stable against chemical attack from CO which will react with metal constituents of the cluster to form various carbonyl species. The CO may be present as CO dissociated from metal carbonyls used as catalyst precursors and/or as CO when used, in whole or in part, as the feedstock gas. Due to the multi-metallic precursor stability and effectiveness in enabling cluster growth, controlling the amount of the multi-metallic precursor permits control of the cluster population and size in the reactor.

Another means to control and enhance the yield and homogeneity of single-wall carbon nanotubes in the process is the introduction of "seed molecules." "Seed molecule" means a molecule which can provide a template for the formation of a single-wall carbon nanotube in the presence of a transition metal catalyst. The use of "seed" molecules that serve as a template for single-wall carbon nanotube growth is described in the commonly assigned patent applications, U.S. patent application Ser. Nos. 10/000,746 and 09/380,545, which applications are hereby incorporated by reference herein in their entirety. The "seed" described in those two aforementioned patent applications is a pre-formed portion of a single-wall carbon nanotube whose length is increased by subsequent exposure to a nanotube growth environment. As used in the present invention, the "seed" provides a framework upon which one end of a new carbon nanotube may form. A combination of the two variations is also within the scope of the present invention. These "seed molecules" may also be referred to as "growth centers," "seeds" or "templates" and serve as nuclei to facilitate the growth of the single-wall carbon nanotubes in the reaction zone. The seed molecules may reduce the energy barrier, or obviate the need, for initiation of the nanotube growth on a catalyst cluster. The process of nanotube growth initiation is considered to be a rate-limiting step in the synthesis of single-wall carbon nanotubes. Even when seeds are used, growth of single-wall carbon nanotubes still involves a transition metal catalyst. When seed molecules are introduced along with a catalyst precursor, the seed molecules serve as nucleation sites for formation of appropriately-sized catalyst clusters. Growth of single-wall carbon nanotubes from templates or seed molecules is also more likely to be a reaction pathway preferred over competing reactions that do not result in the formation of single-wall carbon nanotubes. Such competing reactions may include graphitic or amorphous carbon formation, bond formations that result in defective structures, and reverse reactions. Growth of single-wall carbon nanotubes from the seed molecules result in higher nanotube purity, homogeneity and yield.

The seed molecules for the formation of single-wall carbon nanotubes may encompass several forms. In one type of seed molecule, the nuclei may include a pre-formed part of the structure or framework of a single-wall carbon nanotube. In the reaction zone, growth of the single-wall carbon nanotube continues from the ends of these growth centers. The most energetically-favorable growth from such a seed forms a continuation of the seed molecule, preserving its diameter and helicity. This preservation of diameter and helicity enables production of nanotube product that has a specified and consistent diameter and helicity. Portions of the single-wall carbon nanotube that may be used as growth centers in this group include short lengths of tubular fullerenes, short lengths of derivatized tubular fullerenes, open-ended fullerenes, derivatives of open-ended fullerenes, single-wall carbon nanotubes with pre-attached catalyst particles, aromatic compounds, derivatized aromatic compounds, polycyclic aromatic compounds, and derivatives of polycyclic compounds.

Another type of seed molecule is a carbon-containing growth nucleus which serves as a mold, around which a single-wall carbon nanotube can form. These types of growth centers include fullerenes, such as $C_{60}$, $C_{70}$, other small fullerenes, and derivatized fullerenes. For example, by using $C_{60}$ as the "template," a (10,10) single-wall carbon nanotube is formed around the $C_{60}$ buckyball molecule.

The seed molecules of the present invention are generally non-volatile solids. These species, especially those with little or no derivatization, are also difficult to solubilize, and, therefore, present challenges to introduction into the process. In the present invention, several means to introduce the non-volatile seeds or templates into the reaction zone are revealed. One means for introduction of the seeds or templates is the use of a supercritical fluid as a carrier. Supercritical fluids are known for their excellent solubilizing properties and, in the reaction zone, these fluids provide means for the solute seed or template species to be introduced into the gas stream without condensation or droplet formation as the supercritical fluid expands. The carbon-based nuclei are suspended or dissolved in a supercritical fluid, such as CO and $CO_2$; and the supercritical fluid is kept at supercritical conditions until the seeds or templates are injected into the reaction zone.

A supercritical fluid stream can also be used as a means to introduce the catalyst precursor molecules, such as the multi-metallic molecules, which are generally less volatile than the mono-metallic precursor molecules. The use of the multi-metallic catalyst precursor molecules may be done either with or without the use of seed molecules in the process. Additionally, the catalyst stream may be introduced into the reaction zone either together with the seed molecules or by way of a separate stream. Utilizing a supercritical fluid in the process has several advantages, including the following: (1) The nonvolatile multi-metallic species may be used alone or with volatile mono-metal species as a catalyst precursor for growth of single-wall carbon nanotubes. (2) The ratio of multi-metallic species to mono-metallic species can be set such that the catalyst clusters do not grow beyond sizes that are best for single-wall carbon nanotube growth. This control of catalyst size also provides some control over the average diameter of single-wall carbon nanotubes that are grown. (3) The size distribution of clusters will be narrow since they all start growing at the same point in the catalyst feed flow into the reactor. The active catalyst clusters form quickly, producing a narrow size distribution of catalyst clusters, which, in turn, produce a narrow diameter distribution of single-wall carbon nanotubes. (4) The yield of single-wall carbon nanotubes relative to consumed catalyst may be much larger since the growth period for single-wall carbon nanotubes will be longer because the size of the catalyst cluster is stablized by its interaction with the seed.

Another means of introducing the seed molecules is through the use of an aerosol, consisting of solid or liquid aggregates of seed molecules. Carrier gases for the nuclei in the aerosol form include carbon monoxide and carbon dioxide, small hydrocarbon molecules, inert gases, and mixtures thereof. The aerosol comprising the seed molecules may disperse further to smaller aggregates or individual seed molecules after the aerosol is introduced to the reaction zone.

The various embodiments of the present invention provide improved methods of producing single-wall carbon nanotubes with very high purity, homogeneity and conformational control.

DESCRIPTION OF ILLUSTRATIVE EMBODIMENTS

This invention relates to a method of producing single-wall carbon nanotubes of high purity and homogeneity at high catalyst yield. In one embodiment, the invention relates to producing single-wall carbon nanotubes in high yield, homogeneity, and conformational control, by controlling the cluster size of the catalyst through the use of multi-metallic catalyst precursors. Another means of controlling the size and homogeneity of single-wall carbon nanotubes synthesized is by providing carbon-containing seed molecules to facilitate the growth of highly uniform, high purity single-wall carbon nanotubes in high yield and conformational control. It is in the scope of this invention to use either the multi-metallic catalyst precursors for catalyst cluster control or the seed molecules separately or in combination with each other in the method. Novel methods of introducing the seed molecules and the multi-metallic catalyst precursors into the process include the use of supercritical fluids. The use of an aerosol is also related as an alternate means for introducing the carbon-containing seed molecules.

Figure 1:
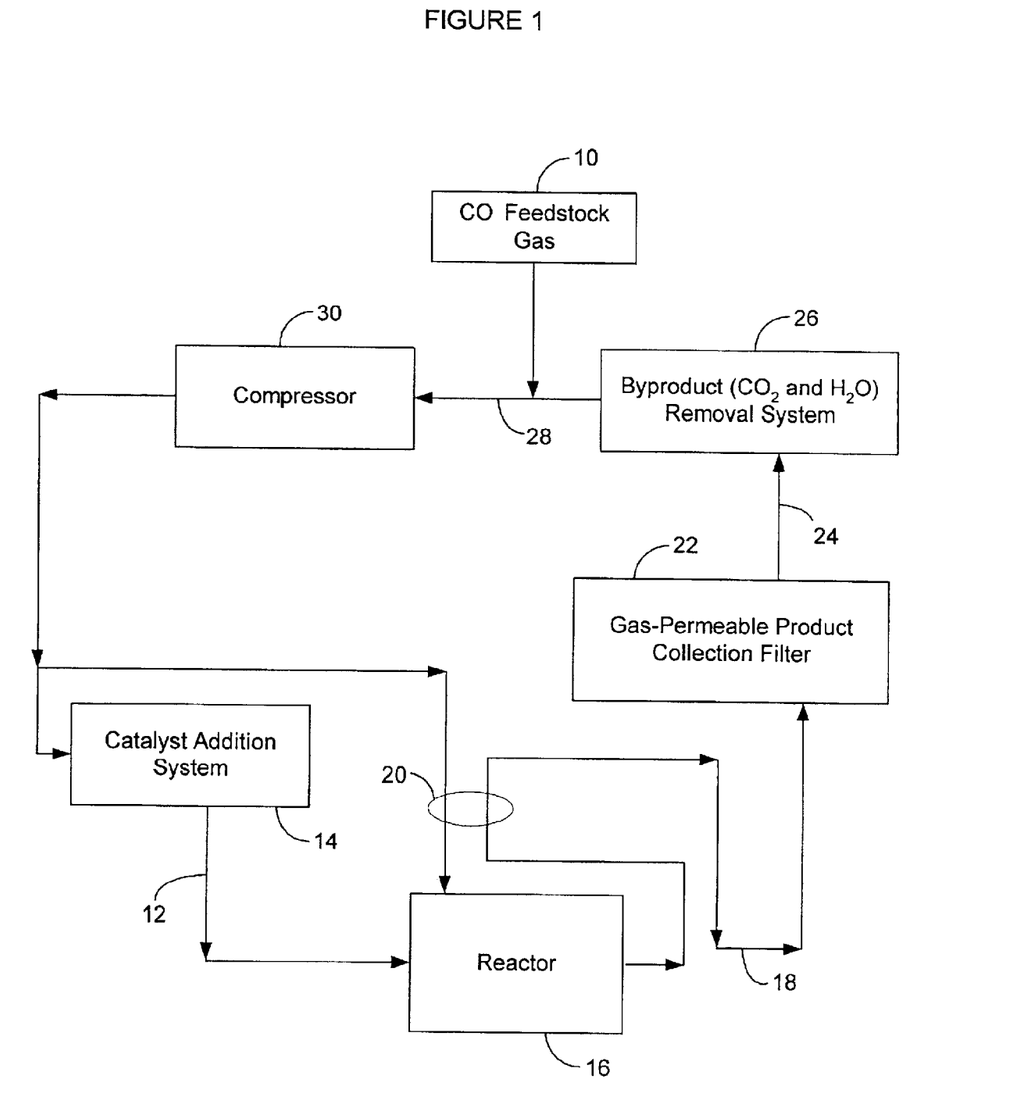
FIG. 1 shows a general schematic of flows in an apparatus for the production of single-wall carbon nanotubes in which a gas is used to introduce volatile or sublimable catalyst precursors for the growth of single-wall carbon nanotubes.

In order to more fully appreciate the scope of the present invention, FIG. 1 presents a schematic of one embodiment showing the general flows in an apparatus useful for performing the method. One of ordinary skill in the art will recognize that other apparatus could be used and are within the scope of the invention as presently claimed. The general scheme of the method includes a carbon feedstock gas (provided from a carbon feedstock gas source 10) and a catalyst stream (provided by flow 12 from a catalyst addition system 14) provided to a reactor 16 for the production of single-wall carbon nanotubes. In the case of the present invention, the catalyst stream represents a mixed gas stream comprising transition metal-containing catalyst precursors and a carrier gas. In the method, the carbon feedstock gas and the catalyst stream are mixed and single-wall carbon nanotubes are formed in the reactor. The single-wall carbon nanotubes, any byproducts, and residual catalyst, suspended in the gas resulting after nanotube synthesis, pass from the reactor in a product stream 18 and are collected on a gas-permeable product collection filter 22. An effluent stream 24, substantially free of single-wall carbon nanotube product, is fed to a byproduct removal system 26 to remove undesirable byproducts, such as $CO_2$ and $H_2O$, among others. A recycle stream 28, consisting essentially of pure carbon feedstock gas, is passed from the byproduct removal system to a compressor 30, where the recycle stream is brought to a desired pressure for recycling to the carbon feedstock gas flow, the catalyst addition system, or both, as desired. The carbon feedstock gas fed to the reactor is heated primarily by heaters inside the reactor, and, in part, by the hot product stream gas mixture passing from the reactor through a heat exchanger section 20.

A correlation between the diameter of single-wall carbon nanotubes and catalyst cluster size has been suggested in supported-metal chemical vapor deposition methods of synthesizing single-wall carbon nanotubes (Dai et al., *Chem. Phys. Lett.* 260:471 (1996)). In the synthesis of single-wall carbon nanotubes, the diameter and conformation of the nanotube is also expected to be correlated with the size of the catalyst cluster. Typically, the diameter of the growing carbon nanotube is proportional to the size of its active catalyst cluster at the time the carbon nanotube begins to grow. Factors that control the catalyst cluster size at the critical time include the concentration of the catalyst precursor, the rate of clustering, the binding energies of the atoms in the clusters, the energy barrier for nanotube nucleation, the temperature during clustering, the temperature during the synthesis of the single-wall carbon nanotubes, and the temperature, pressure and concentration of CO, which arises both from the decomposition of any metal carbonyl used as a catalyst precursor, as well as from CO when CO is used as the carbon-containing feedstock for single-wall carbon nanotube synthesis.

The catalyst cluster size, and, consequently, the single-wall carbon nanotube diameter, is expected to be affected by the ratio of feedstock molecules to catalyst precursor molecules. When CO is used as the carbon feedstock, a greater proportion of feedstock molecules to catalyst precursor molecules results in smaller catalyst clusters and thus smaller diameter carbon nanotubes. Conversely, a lower proportion of CO feedstock molecules to catalyst precursor molecules results in larger catalyst clusters and thus larger diameter single-wall carbon nanotubes.

Increasing the concentration of the transition metal precursor generally increases the rate of clustering and diameter of the catalyst clusters. The single-wall carbon nanotube will initiate and grow on a catalyst cluster of a certain size range. If the cluster is too small, nanotubes will not be initiated and grow; if the cluster is too large, the catalyst cluster will overcoat with carbon and be inactive for nanotube growth.

Pressure of the carbon feedstock gas is another parameter capable of affecting catalyst cluster size and single-wall carbon nanotube diameter. When the feedstock is CO, higher pressures of the CO tend to result in smaller-diameter single-wall carbon nanotubes. Although not wanting to be held by theory, it is believed that higher CO pressures and concentrations counter clustering by reacting with the metal atoms from the catalyst precursors and forming various carbonyl species. Conversely, catalyst clustering in the presence of lower CO concentrations and pressures is expected to result in larger cluster diameters at the time of initiation of nanotube growth.

Reaction temperature is also a factor in the size of the catalyst clusters and the diameter of the single-wall carbon nanotubes. Generally, the diameter of the single-wall carbon nanotube decreases with increasing temperature. Although not wanting to be bound by theory, this may be due to metal atoms of the clusters evaporating and reducing the cluster size at higher nanotube synthesis temperatures, or it may be a consequence of more facile initiation of nanotube growth at elevated temperatures.

Another control mechanism involves the addition of a metal-containing nucleation agent, such as $Ni(CO)_4$, which promotes the aggregation of metal catalyst clusters. Nucleation agents that comprise metal atoms that have higher binding energies with iron and with each other than two iron atoms would have for one another, would enable the binding of two or more metal species that serves to initiate cluster growth. Generally, larger single-wall nanotubes have been observed with the use of nucleation agents. Although not wanting to be bound by theory, the larger diameter single-wall carbon nanotubes may be due either to the presence of larger catalyst clusters at the time the initiation of single-wall carbon nanotubes on the cluster or to a different rate and chemistry of initiation of formation of the tube on a catalyst cluster containing a different transition metal composition.

Initiating and growing single-wall carbon nanotubes on catalyst clusters with variable sizes leads to a distribution of sizes and conformations of single-wall carbon nanotubes. Size and conformation homogeneity of the single-wall carbon nanotube is directly related to initiation of nanotube growth on catalyst clusters of approximately the same size and in the range that produces the single-wall carbon nanotubes. Forming metal catalyst clusters of uniform size from the decomposition of metal catalyst precursor molecules, especially from mono-metallic species, in the reaction zone while concurrently forming single-wall carbon nanotubes on those clusters is difficult, as it would, among other things, entail a complicated coordination of multiple events. First, since the catalyst clusters form by random collisions of the metal atoms, cluster growth is inherently difficult to control. Furthermore, since the reaction zone conditions are set primarily to optimize the initiation, growth and yield of single-wall carbon nanotubes, the optimum conditions for the growth of the catalyst clusters are not independently controlled. Although the operating parameters are not independently controlled to optimize cluster growth, the operating parameters appear to directly affect cluster size and the resulting diameter and yield of single-wall carbon nanotubes.

Conditions affecting single-wall carbon nanotube diameter also affect nanotube yield. Conventional means to increase yield and rates of production, may actually give the opposite result in the case of CO as a feedstock. Conventionally, higher yields in many processes can often be achieved with higher temperatures, pressures, catalyst and feed concentrations. In the case of CO as a carbon feedstock, single-wall carbon nanotube yield decreases at temperatures above 1050° C. Higher yields are observed with at higher pressures when accompanied with higher catalyst concentrations. (See Bronikowski, et. al., *J. Vac. Sci. Technol.* A 19:1800 (2001)). The need remains for a process that will provide high yields of single-wall carbon nanotubes with independent control of the single-wall carbon nanotube diameter and conformation.

Using CO as a carbon-feedstock, transition metal catalysts are needed to catalyze the Boudouard reaction ($CO+CO \rightarrow C+CO_2$) to provide carbon for nanotube growth. Transition metal catalyst precursors used in the process for synthesizing single-wall carbon nanotubes are often carbonyls of Group VIb and Group VIIb transition metal elements, although other transition metal catalyst precursors like ferrocene, nickelocene and cobaltocene may also be used. Of the mono-metallic carbonyls, iron pentacarbonyl and nickel tetracarbonyl are preferred. In the process, the transition metal precursor molecules may be dissociated by heat as they enter the reaction zone. Upon dissociation, the metal atoms cluster and form the catalyst for nanotube synthesis. Besides the initiation and nucleation of the single-wall carbon nanotube on the cluster, the clustering of the metal atoms is also believed to be a rate-limiting step in the growth of single-wall carbon nanotubes in the process. The catalyst clustering is complicated by reactions involving various metal carbonyl species. Also working against the desired clustering is weak metal-metal bonding. In the case of iron, the binding energy for a Fe—Fe dimer is on the order of 1 eV. It is possible and desirable to add nickel to the catalyst to improve the nucleation and clustering because the Ni—Ni binding energy is on the order of 2 eV, or approximately twice that of iron.

The obstacles to cluster formation, including metal reactions with CO and low metal-metal binding energies, are reduced in the present invention by using multi-metallic catalyst precursor molecules which facilitate efficient clustering. This is a result of their larger collision cross-sections and associated higher probability of reaction with other metal atoms or clusters versus reaction of two individual metal atoms with each other. The larger the catalyst cluster, the more stable it is and the more likely it is to grow because colliding metal atoms have the possibility of forming two or more metal-metal bonds with the cluster atoms as opposed to only a single metal-metal bond in the case of two mono-metallic species. Therefore, shortly after the initial nucleation of a limited number of catalyst clusters, catalyst cluster growth dominates over additional cluster nucleation.

Thus, by providing catalyst precursor molecules having multiple metal atoms, initially to the reaction zone, it is possible to independently control the number of catalyst clusters, because the multi-metallic molecules readily nucleate clusters, and each of them rapidly becomes involved in a growing cluster. Since the initial cluster size is primarily determined and dominated by the multi-metallic species used, and the cluster growth dynamics dependent on the types and concentrations of any other metallic precursors added, as well as operating conditions, the cluster size distribution during the initial synthesis of the nanotubes in the reaction zone is also controllable through a number of independent parameter options. With the control of the concentration and size of the catalyst clusters in the reaction zone, the size and conformation of the single-wall carbon nanotubes are also controlled and, thus, enabling conformational homogeneity of the single-wall carbon nanotubes. Because, the rate-limiting step of catalyst cluster initiation is essentially bypassed, single-wall carbon nanotube formation will compete favorably versus the formation of other carbon species, such as overcoating of the catalyst clusters and amorphous carbon formation, and thereby enabling high yield of single-wall carbon nanotubes.

Multi-metallic catalyst precursor molecules can be of various nuclearities, although higher nuclearities are preferred. Multi-metallic catalyst precursor molecules which have only two or three metal atoms can serve as transient intermediate species for the formation of higher nuclearity metal precursor molecules. For example, stable di- and tri-iron carbonyl species can serve as intermediates in the formation of higher nuclearity iron carbonyl species. Direct dimerization of $Fe(CO)_5$ to $Fe_2(CO)_9$, as well as other iron dimer carbonyls, such as $Fe_2(CO)_n$ (where n<10), may also be accomplished at high temperature in high pressure CO. Examples of other multi-metal iron precursors molecules include such molecules as $Fe_3(CO)_{12}$, $Fe_4C(CO)_{13}$ and $Fe_5C(CO)_{15}$. Optionally, mono-metallic species, such as $Fe(CO)_5$ may be added in addition to multi-metallic precursor molecules. Other stable metal carbonyls such as $Ru_4C(CO)_{13}$, $Ru_5C(CO)_{15}$, $Ru_6C(CO)_{17}$ and $Os_5C(CO)_{15}$ are examples of non-iron species that can serve as nucleating agents for growth of iron clusters. Since iron is a preferred catalyst for the synthesis of single-wall carbon nanotubes, it is preferable that non-iron multi-metallic species be stable in a high pressure hot CO environment for a time sufficient for iron, such as from $Fe(CO)_5$, to cluster with the non-iron multi-metallic species. Mono-metallic catalyst precursors may be used in addition to any multi-metallic catalyst precursors to further control the cluster formation and dynamics. Volatile mono-metallic catalyst precursors may be introduced into the reaction zone by way of a gas stream which is below the temperature of decomposition just prior to or upon entering the reaction zone.

In previous methods for preparing single-wall carbon nanotubes, all reactant and catalyst precursor species are introduced in a volatile form into the reaction zone. Many mono-metallic catalyst precursor molecules that have been used are either volatile liquids or sublimable solids. Since the multi-metallic catalyst precursor molecules in the present invention are generally non-volatile solids, common methods used for volatile liquids and sublimable solids are ineffective. However, the present invention provides a means of keeping the non-volatile and non-sublimable catalyst precursors at a temperature below their dissociation temperature while providing a means of introducing them into the reaction zone in mono-disperse form. In the present invention, introduction of these species in a known and reproducible concentration is accomplished through use of a supercritical fluid. Supercritical fluids have exceptional solvating properties and, as such, have the advantage of being able to dissolve various solutes. They also typically have the advantage that as the supercritical fluid evaporates, the solute molecules can go directly into the vapor phase as mono-disperse species without concentrating and condensing in the supercritical fluid. "Supercritical fluid" means a compound having temperature and pressure near, at, or above the critical point, viz., a compound possessing properties of both liquids and gases. Supercritical fluids are characterized by their critical constants including critical temperature $T_c$, the highest temperature a fluid can be liquefied, and critical pressure $P_c$, the minimum pressure needed to liquefy a gas at its critical temperature. "Near" the critical point means that the temperature of the compound is at least about 95% absolute of the critical temperature and the pressure of the compound is at least about 95% of the critical pressure.

Preferred supercritical fluids include carbon monoxide ($T_c=-140°$ C., $P_c=34.5$ atm) and carbon dioxide ($T_c=31°$ C., $P_c=72.9$ atm). A mixture of supercritical CO and $CO_2$ may also be used.

The transition metal catalyst and precursors, including mono-metallic and multi-metallic species, may be dissolved, suspended, or both in the supercritical fluid. "Dissolved" as used herein means that individual molecules or physically joined groups of molecules are solvated by the supercritical fluid, whereas "suspended" as used herein means that individual molecules or physically joined groups of molecules are maintained in the supercritical fluid by collisions between molecules of the supercritical fluid and the suspended molecules. Both processes may be occurring to some extent.

As an alternative to the supercritical fluid containing all catalyst precursors for the synthesis, the non-volatile multi-metallic species may be in a supercritical fluid, while any volatile or sublimable species may be in a separate gas stream. This alternative scenario provides the opportunity to control the addition of two different catalyst precursor streams independently.

One embodiment of the present invention relates to the use of large, multi-metallic catalyst precursor molecules as the starting point for the formation of uniform metal catalyst clusters. In this scenario, the catalyst stream consists of multi-metallic catalyst precursors that are dissolved, suspended, or both in a supercritical fluid, with each catalyst precursor comprising two or more atoms of at least one transition metal selected from the group consisting of Group VIb elements and Group VIIIb elements. The temperature of the supercritical fluid catalyst stream is kept at a temperature below the decomposition temperature of any catalyst precursor present.

The carbon feedstock gas stream is heated to a temperature above the minimum initiation temperature for single-wall carbon nanotube formation. The supercritical fluid catalyst stream and the carbon feedstock gas stream are mixed as the streams enter the reactor for making single-wall carbon nanotubes. Upon mixing the carbon feedstock gas stream with the supercritical fluid catalyst stream, a mixed gas stream is formed and the catalyst precursor molecules are heated to a temperature at which cluster formation can take place, and catalyst clusters initiate and grow. The temperature of the mixed stream is also sufficient to promote the initiation and growth of single-wall carbon nanotubes on the catalyst clusters. Single-wall carbon nanotubes grow in the reactor and are suspended in the mixed gas stream as they flow through the reactor in the mixed gas stream. After exiting the heated reactor, the single-wall carbon nanotubes are separated from the mixed-gas stream by collecting the single-wall carbon nanotubes on a gas-permeable filter.

Another embodiment of the present invention relates to a method for producing single-wall carbon nanotubes, comprising: (a) providing a supercritical fluid catalyst stream comprising (i) a supercritical fluid and (ii) a catalyst precursor selected from the group consisting of multi-metallic catalyst precursors, mono-metallic catalyst precursors, and mixtures thereof that are dissolved, suspended, or both in the fluid, each multi-metallic catalyst precursor comprising at least two atoms, and each mono-metallic catalyst precursor comprising one atom, of at least one transition metal selected from the group consisting of Group VIb elements and Group VIIIb elements, wherein the supercritical fluid catalyst stream is at a temperature below the decomposition temperature of the catalyst precursor; (b) providing a carbon feedstock gas stream at a temperature above the minimum single-wall carbon nanotube formation initiation temperature; and (c) mixing the carbon feedstock gas stream with the supercritical fluid catalyst stream to form a mixed gas stream, wherein (i) the catalyst precursor reaches a temperature above the decomposition temperature of the catalyst precursor, (ii) the temperature is sufficient to promote the initiation or growth of catalyst clusters, and (iii) the temperature is sufficient to promote the initiation and growth of single-wall carbon nanotubes on the catalyst clusters and to form the single-wall carbon nanotubes in the mixed gas stream.

To independently control the addition of the multi-metallic catalyst precursors and the volatile mono-metallic catalyst precursors, separate streams of introduction may be used. In this case the multi-metallic catalyst precursor would be introduced in the supercritical fluid stream, and the volatile mono-metallic catalyst precursor would be introduced in a separate gas stream. In this alternate embodiment, a separate gas stream comprising (i) a carrier gas and (ii) a volatile or sublimable mono-metallic catalyst precursor is also introduced into the reaction zone. The carrier gas is selected from the group consisting of CO, $CO_2$, hydrocarbons, rare gases, inert gases, and mixtures thereof. As this gas stream enters the reaction zone for the synthesis of single-wall carbon nanotubes, the mono-metallic catalyst precursor decomposes and the resulting metal-containing decomposition fragments cluster with the catalyst clusters derived from the multi-metallic catalyst precursor molecules from the supercritical fluid stream.

The supercritical fluid may be any supercritical fluid compatible with the method and supplied at, above or near the critical point. Preferably, the supercritical fluid comprises $CO_2$, CO, or mixtures thereof. More preferably, the supercritical fluid comprises $CO_2$ and $P_{CO2}$ is at least about 73 atm.

Multi-metallic and mono-metallic catalyst precursors comprise one or more metal atoms, wherein the metal is selected from the transition metals of Group VIb, Group VIIIb, or both. Suitable metals include, but are not limited to, tungsten, molybdenum, chromium, iron, nickel, cobalt, rhodium, ruthenium, palladium, osmium, iridium, platinum, and mixtures thereof. Iron and nickel are preferred metals for the mono-metallic catalyst precursors. Iron, ruthenium and osmium are preferred metals included in the multi-metallic catalyst precursors.

Mono-metallic and multi-metallic catalyst precursors also comprise one or more non-metal atoms. Preferably, the catalyst precursors are metal carbonyls. More preferably the mono-metallic catalyst precursor is a carbonyl selected from $Fe(CO)_5$, $Ni(CO)_4$, or combinations thereof. More preferably the catalyst precursor is a multi-metal carbonyl selected from $Fe_2(CO)_9$, $Fe_3(CO)_{12}$, $Fe_4C(CO)_{13}$, $Fe_5C(CO)_{15}$, $Ru_4C(CO)_{13}$, $Ru_5C(CO)_{15}$, $Ru_6C(CO)_{17}$, $Os_5C(CO)_{15}$, or mixtures thereof.

The size of the catalyst cluster provides a control mechanism for the diameter of the resulting single-wall carbon nanotube. If the catalyst clusters are substantially all the same size, and reaction conditions are controlled such that minimal aggregation occurs with other catalyst clusters or with metal atoms derived from other catalyst precursors such that substantially uniform clusters are introduced into the reaction zone and mixed with the heated carbon-feedstock gas, the resulting catalyst clusters would be expected to be highly homogeneous and produce a population of single-wall carbon nanotubes which are highly homogeneous in diameter, that diameter being proportional to the catalyst cluster size. Catalyst clusters in the diameter range of about 0.5 nm to about 3 nm are conducive for the synthesis of single-wall carbon nanotubes. Preferably, the diameter of the catalyst clusters is in the range of about 0.5 nm to about 2 nm.

Generally, multi-metallic precursors with a greater number of metal atoms are preferred for a number of reasons. First, less subsequent clustering is required after dissociation, which permits more rapid initiation and growth of the single-wall carbon nanotubes. Second, metal-metal bonding in the precursor gives greater cluster stability against reactions with high temperature and pressure CO in the reactor to form gas-phase carbonyls. Third, the collision cross-sectional area is greater in molecules with more metal atoms, which facilitates clustering. And, fourth, larger multi-metallic precursors will be more dominant in the cluster formation and may minimize the effect of small cluster formation by any mono-metallic species added to the reactor.

Each catalyst precursor molecule has a decomposition temperature at, or above which, the non-metal atoms of the catalyst precursor dissociate from the metal atom(s). The catalyst precursor molecules are kept at a temperature below their decomposition temperature until they begin to react to form clusters. After the cluster-forming processes begin, the metal atom(s) of the catalyst precursor aggregate with other metal atoms from either mono-metallic or multi-metallic catalyst precursor species or both, to form a suitable metal catalyst cluster for the initiation and growth of single-wall carbon nanotubes.

Dissociation of any catalyst precursors used may comprise mixing any of the catalyst precursor streams with a heating gas such that temperature of the resulting gas stream is above the decomposition temperature of the catalyst precursor. The dissociation is conveniently done in the reaction zone, with the heating gas comprising the carbon-containing feedstock for the formation of single-wall carbon nanotubes.

Alternatively, dissociation of the catalyst precursor molecules and catalyst clustering may be done just prior to the clusters entering the reaction zone. In this case, any catalyst precursor streams are heated to a temperature at or above which the catalyst precursors will dissociate and sufficient to promote the initiation and growth of catalyst clusters. The supercritical catalyst precursor stream comprising a supercritical fluid and catalyst precursors will, with sufficient heating, become a supercritical fluid catalyst stream comprising a solution or suspension of catalyst clusters. Preferably, the fluid is kept supercritical throughout catalyst precursor decomposition and clustering so that the catalyst clusters in the supercritical fluid enter the reaction zone as mono-disperse clusters. Heating temperature and residence time for clustering prior to entering the reaction zone are a function of the particular multi-metallic precursor used and its concentration in the carrier fluid.

Alternatively, or in addition thereto, initiation of cluster formation from the catalyst precursors may be by subjecting the supercritical fluid catalyst stream to electromagnetic radiation. This electromagnetic radiation may be incoherent, such as that from a flashlamp or, alternatively, may be substantially coherent substantially monochromatic electromagnetic radiation. "Substantially coherent substantially monochromatic electromagnetic radiation" means electromagnetic radiation wherein at least about 90% of the energy of the radiation is possessed by photons having a wavelength within about 5 nm longer or shorter than a peak wavelength. A laser is an exemplary source of such substantially coherent substantially monochromatic electromagnetic radiation.

The energy of the electromagnetic radiation desirably is sufficient to dissociate nonmetal atoms from the catalyst precursor. Desirably, the energy output of the radiation source is greater than the amount of energy required to dissociate nonmetal atoms from the catalyst precursor, to compensate for energy of the radiation that may be absorbed by molecules in the fluid stream other than the catalyst precursor, that may be associated with photons that pass through the catalyst precursor gas stream without imparting their energy to molecules in the catalyst precursor gas stream, or that may otherwise not contribute to dissociation of nonmetal atoms from the catalyst precursor.

The energy output of the radiation source required to provide sufficient dissociation of nonmetal atoms from the catalyst precursor will depend on the peak wavelength of the radiation, the ability of molecules in the gas stream other than the catalyst precursor to absorb radiation at or near the peak wavelength, the duration time, and other parameters that will be apparent to one of ordinary skill in the art. Preferably, the electromagnetic radiation has a peak wavelength of about 200 nm to about 300 nm. An exemplary source of such radiation with such a peak wavelength is a KrF laser (peak wavelength about 248 nm). Typically, with the KrF laser described above, the duration time is sufficient to substantially completely dissociate nonmetal atoms from the catalyst precursor.

The carbon feedstock gas for the formation of single-wall carbon nanotubes is a gas selected from CO, $CO_2$, methane, ethylene, or mixtures thereof. More preferably, the carbon feedstock is selected from CO, hydrocarbons, or mixtures thereof. The temperature of the carbon feedstock gas may be any temperature which will, after mixing with any catalyst precursor gas streams, be sufficient to decompose any undissociated metal catalyst precursors, promote the clustering of the dissociated metal atoms and also be sufficient to promote the initiation and growth of single-wall carbon nanotubes. Preferably, the temperature of the mixed gas stream comprising the carbon feedstock gas stream and any streams containing catalyst precursors or catalyst clusters is at least about 850° C. More preferably, the temperature of this mixed gas stream is at least about 900° C.

The carbon feedstock stream and any catalyst stream containing catalyst precursors or catalyst clusters are supplied at a pressure of at least the desired operating pressure in the reactor for the synthesis of single-wall carbon nanotubes. The pressure of the carbon feedstock stream, any stream containing catalyst precursors or clusters, and the reaction zone is from about 3 atm to about 1000 atm, more preferably from about 5 atm to about 500 atm, and most preferably, from about 30 atm to 500 atm.

Catalyst precursor or catalyst clusters in a gas stream or supercritical stream can be provided at any desired concentrations. The concentration of catalyst precursor or catalyst clusters in a supercritical fluid stream is preferably from about 1 ppm to about 100 ppm, more preferably from about 5 ppm to about 50 ppm. The concentration of the catalyst precursor in a separate catalyst precursor gas stream is preferably from about 1 ppm to about 100 ppm, more preferably from about 5 ppm to about 50 ppm.

Mixing of the carbon feedstock gas stream with the supercritical fluid catalyst stream and any other catalyst precursor streams results in a mixed gas stream. The mixing of these streams can be performed in the reactor by any appropriate technique. The temperature of the carbon feedstock gas should be sufficient such that the mixed gas stream in the reaction zone is at or above the temperature required to enable cluster-forming reactions of the catalyst precursors, producing metal-containing catalyst clusters. The temperature of the mixed gas stream should also be sufficient to promote the initiation and growth of carbon nanotubes on the catalyst clusters. The mixed gas stream may be kept at the temperature for any length of time sufficient for the growth of single-wall carbon nanotubes with desired length or other properties provided by the duration of the reaction. After time sufficient for the growth of single-wall carbon nanotubes, the resulting gas stream comprises single-wall carbon nanotubes in suspension in the mixed gas stream. The single-wall carbon nanotubes can be recovered on a gas-permeable filter sufficiently fine to remove the single-wall carbon nanotubes from the mixed gas stream.

One benefit of the present invention is that single-wall carbon nanotubes typically initiate and grow rapidly on catalyst clusters in the size range of about 0.5 nm to about 3 nm. This rapid growth soon leads to long single-wall carbon nanotubes. Collisions of long single-wall carbon nanotubes with other metal catalyst clusters will generally dominate over collisions of metal catalyst clusters with each other and thus inhibit aggregation of the catalyst clusters into larger clusters that are more likely to become inactive.

Figure 2:
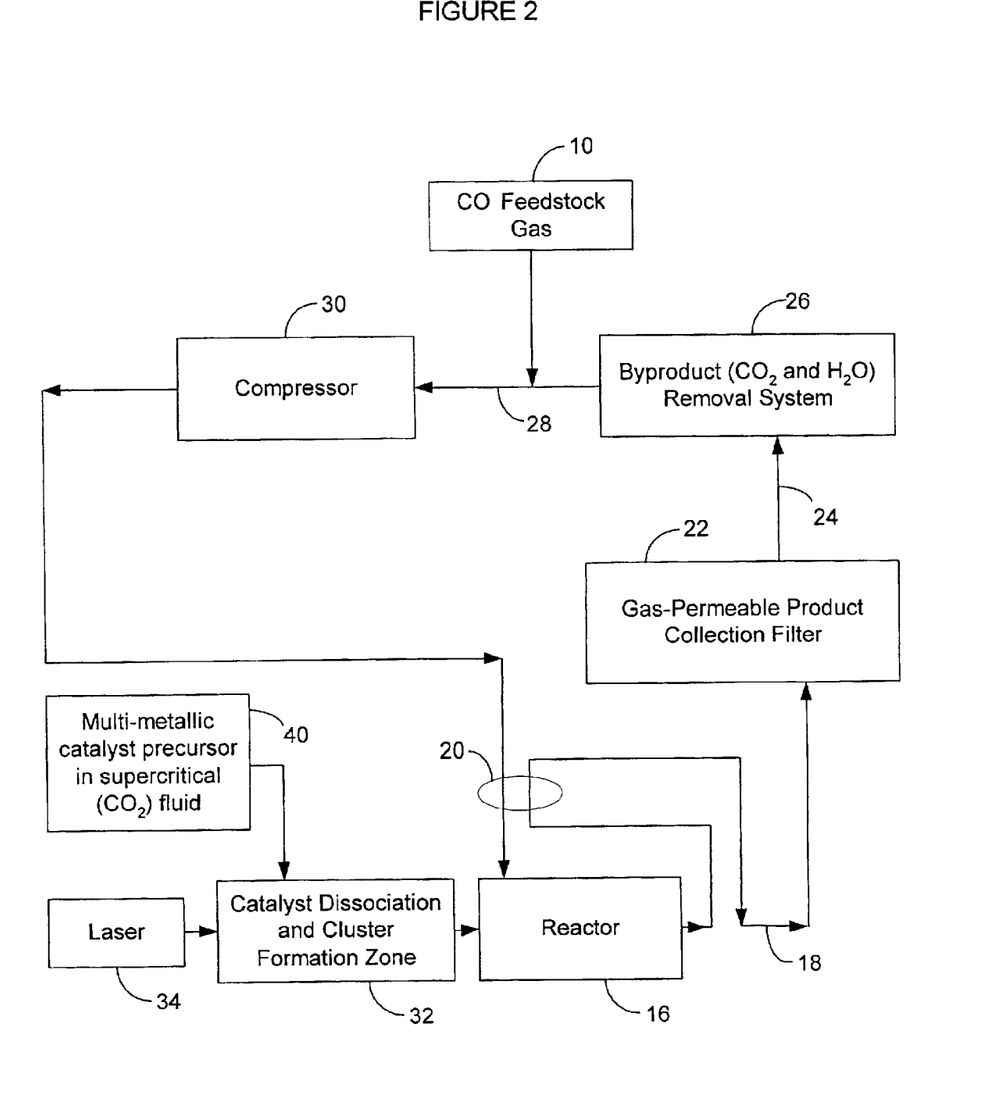
FIG. 2 shows a general schematic of flows in an apparatus for the production of single-wall carbon nanotubes in which a multi-metallic catalyst precursor molecules in a supercritical fluid are used to make the catalyst clusters for the growth of single-wall carbon nanotubes.
Figure 3:
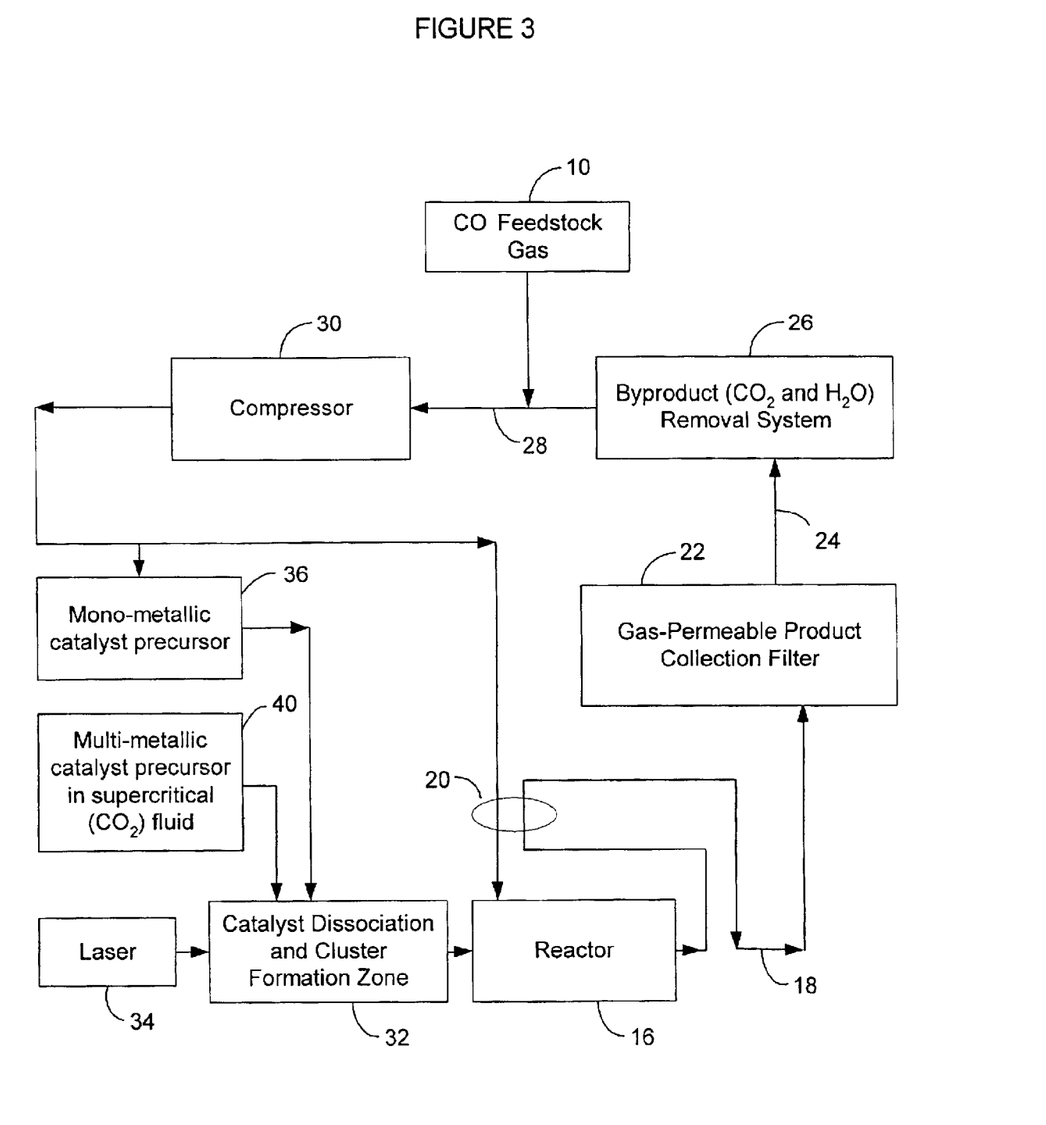
FIG. 3 shows a general schematic of flows in an apparatus for the production of single-wall carbon nanotubes in which multi-metallic catalyst precursor molecules in a supercritical fluid and mono-metallic catalyst precursors are used to make the catalyst clusters for the growth of single-wall carbon nanotubes.

FIGS. 2 and 3 illustrate several possible embodiments of the present invention. FIG. 2 illustrates a method of making single-wall carbon nanotubes using a multi-metallic catalyst precursor in a supercritical fluid. FIG. 2 contains the same components as FIG. 1, except that the catalyst addition system 14 of FIG. 1 is replaced with a system to introduce multi-metallic catalyst precursors. In FIG. 2, multi-metallic catalyst precursor in supercritical fluid 40 is flowed to a catalyst dissociation and cluster formation zone 32. In this zone, the catalyst precursor is dissociated and catalyst clusters of the appropriate size for synthesis of single-wall carbon nanotubes are formed. The initiation of the clustering reactions in the catalyst precursor may be done with electromagnetic radiation, such as a laser 34, as shown, or by heating above the dissociation temperature of the precursor or a combination of both. Irrespective of the method of reaction initiation, the metal atoms cluster and are injected into the reactor 16 where the catalyst stream is mixed with a hot carbon-containing feedstock stream in which the temperature of the resulting mixed stream is sufficient to initiate and form single-wall carbon nanotubes on the metal catalyst clusters. It is also within the realm of the present invention to inject the multi-metallic catalyst precursor in supercritical fluid directly into the reactor without any prior clustering. In the latter scenario, the metal catalyst precursor dissociates and the metal atoms cluster in the reactor when heated by the hot carbon-containing feedstock gas. When catalyst clusters of a sufficient size are formed, initiation and growth of the single-wall carbon nanotubes proceeds on the clusters. Although not shown in the diagram, it is possible, and desirable, to recycle any recovered $CO_2$ from the byproduct removal system 26, back to into use for dissolving or suspending multi-metallic catalyst precursors in supercritical $CO_2$ fluid.

Another embodiment of the present invention is illustrated in FIG. 3. In this schematic, a mono-metallic catalyst precursor is used in addition to the multi-metallic catalyst precursor in supercritical fluid. In this scenario, which is similar to FIG. 2, except for the addition of mono-metallic catalyst precursor 36. In this illustration, the mono-metallic catalyst precursor, such as $Fe(CO)_5$, is volatilized or sublimed in the carbon-containing feedstock gas. The mono-metallic catalyst precursor stream and the multi-metallic catalyst precursor in supercritical fluid stream are introduced into a catalyst dissociation and cluster formation zone 32. As in the scenario described by FIG. 2, dissociation may be done by heat, electromagnetic radiation or both. Also, it is in the realm of this invention to add the mono-metallic precursor and multi-metallic precursor streams directly to the reactor, wherein the precursors are dissociated by hot carbon-containing feedstock gas. Clustering then occurs in the reactor and synthesis of single-wall carbon nanotubes proceeds by initiating and growing on the metal catalyst clusters. Although not shown in the diagram, it is possible, and desirable, to recycle any recovered $CO_2$ from the byproduct removal system 26, back to into use for dissolving or suspending multi-metallic catalyst precursors in supercritical $CO_2$ fluid.

In the previous embodiments, the single-wall carbon nanotube conformation and homogeneity was achieved by supplying metal catalyst clusters of approximate uniform size and in the range that promotes the synthesis of single-wall carbon nanotubes. The present invention also provides means for obtaining single-wall carbon nanotubes of in high yield and homogeneity through the use of seed molecules for single-wall carbon nanotube growth. In this embodiment, the nucleation of the single-wall carbon nanotube on the catalyst cluster, which is also believed to be a rate-limiting step, is facilitated or obviated by supplying carbon-containing templates or pre-formed portions of single-wall carbon nanotubes to increase nanotube yield and homogeneity.

Seed molecules are molecules which can provide templates for the formation of single-wall carbon nanotubes in the presence of transition metal catalyst clusters. The template may be incorporated into the single-wall carbon nanotube or it may provide a framework around which one end of the carbon nanotube may form. A combination of the two is also within the scope of the present invention. Fullerenes are compounds that comprise a shell of carbon atoms typically arranged at the vertices of hexagons, pentagons, or both. $C_{60}$ is an exemplary fullerene, but other molecules, such as $C_{70}$, may also be used. $C_{60}$ and $C_{70}$ are preferred. Single-wall carbon nanotubes of any length are also referred to as fullerenes. "Polycyclic aromatic compound" means any compound comprising two or more aromatic groups, wherein each aromatic group shares at least one carbon-carbon bond with another aromatic group. Preferably, the polycyclic aromatic compound comprises from about 10 to about 30 carbon atoms. Examples of polycyclic aromatic compounds include, but are not limited to, corannulene ($C_{20}H_{10}$), corannene, and pentacene, among others.

Fullerenes and polycyclic aromatic compounds are generally about as soluble in supercritical carbon dioxide as they are in hexane. However, the solubility of these compounds in other supercritical fluids may not be as high, or in certain applications a higher solubility may be sought. The fullerenes and polycyclic aromatic compounds may be derivatized. "Derivatized," in the case of a fullerene, means that one or more moieties containing atoms other than carbon are present on the exterior of the fullerene and each moiety is bonded to a carbon atom that is a component of the fullerene core. In the case of polycyclic aromatic compounds, "derivatized" means that one or more moieties are bonded to a carbon atom of the polycyclic aromatic core as a substituent for a hydrogen atom bonded to the carbon atom in the polycyclic aromatic core. An example of derivative substituents are halogen atoms, such as fluorine.

Derivatization of the fullerene or the polycyclic aromatic compounds may be desirable to enhance the solubility of the fullerene or the polycyclic aromatic compound in the supercritical fluid, to enhance the reactivity of the fullerene or the polycyclic aromatic compound in the formation of the single-wall carbon nanotubes, or to provide other benefits, alone or in any combination. Preferably, the moiety with which the fullerene or the polycyclic aromatic compound is derivatized is a halogen. More preferably, the moiety is fluorine. The size and nature of the seed molecule may provide an additional avenue for controlling carbon nanotube diameter.

The seed molecules take several forms. In one form, the seeds are portions of single-wall carbon nanotubes, which provide sites for continued growth of the nanotubes. Examples of these types of seeds include short open-ended single-wall carbon nanotubes, derivatized short open-ended single-wall carbon nanotubes, aromatics, derivatized aromatics, polycyclic aromatics, derivatized polycyclic aromatics, and short lengths of open-ended single-wall carbon nanotubes with pre-attached catalyst clusters. For example, in the case of a short length of an open-ended single-wall carbon nanotube "seed" in the presence of an appropriate transition metal catalyst, a single-wall carbon nanotube will grow from the open-end of the "seed" with the same conformation and size as the seed species. By only "seeding" one type of growth center, the single-wall carbon nanotubes derived from the seeds will be of the same type and conformation.

Likewise, nucleation centers in the form of templates, around which a single-wall carbon nanotube can form, also results in size and conformational uniformity in the single-wall carbon nanotubes. In this case, the growth centers include carbon-containing molecules, such as $C_{60}$, $C_{70}$, other small fullerenes, short single-wall carbon nanotubes, and derivatized versions of any of these fullerenes. In this scenario, for example, a $C_{60}$ buckyball, may be used as the template for (10,10) type single-wall carbon nanotubes. Since it is possible to purify, or obtain very pure, $C_{60}$, it is possible to produce single-wall carbon nanotubes with high conformational homogeneity.

Both types of growth centers assist in the rapid growth of single-wall carbon nanotubes either by obviating the need for the initiation of single-wall carbon nanotube growth on the catalyst cluster, in the case of seed molecules which are portions of single-wall carbon nanotubes with edges for continued growth or by providing a template to facilitate the single-wall carbon nanotube growth, in the case of the fullerene molds. Bypassing the initiation of growth on the catalyst cluster, believed to be a rate-controlling step, also increases the nanotube yield based on catalyst, since more single-wall carbon nanotubes can be formed before the catalyst cluster grows too large to catalyze further nanotube growth. When the catalyst clusters grow beyond the preferred range to catalyze single-wall carbon nanotube growth, carbon overcoating of the catalyst cluster is energetically preferred and predominates, and thus inactivates the clusters catalytically.

In the present invention, the seed molecules, such as $C_{60}$, any carbon-containing nuclei acting as either seeds for further growth or mold-like templates, are solvated or suspended in the supercritical fluid and introduced into the reaction zone in a separate stream. Additionally, depending on the conditions desired, multi-metallic catalyst precursor molecules may be solvated or suspended in the same or a separate supercritical fluid stream. As the supercritical fluid enters the reaction zone, the supercritical fluid expands rapidly without any latent heat of vaporization and isotropically disperses the carbon-containing growth centers and any catalyst precursor species, if present, without concentrating the solute molecules in a meniscus. In the reaction zone, the carbon-containing seed molecules facilitate the growth of single-wall carbon nanotubes in the presence of the transition-metal catalyst clusters and a carbon-containing feedstock gas.

Depending on the particular catalyst conditions desired, mono-metallic catalyst precursor molecules, as well as, alternatively, any volatile or sublimable multi-metallic catalyst precursor molecules, may be introduced by passing a carrier gas through the liquid or solid catalyst precursor at a temperature sufficient to volatilize or sublime the substance and carry volatilized or sublimed catalyst precursor molecules into the reaction zone. Mono-metallic or multi-metallic catalyst precursor molecules may be each used alone or in any combination with other mono-metallic or multi-metallic catalyst precursor molecules, and any carbon-containing seed molecules.

The large multi-metal catalyst precursor molecules, and the carbon-containing seed molecules are generally non-volatile solids. Multi-metallic catalyst precursors and seed molecules, which are either underivatized or lightly derivatized, are also generally insoluble in common solvents. Low solubility and volatility are obstacles to introducing the moieties into the process. One means of introducing large multi-metallic catalyst precursors or the seeds molecules is the use of a supercritical fluid as the carrier. The large multi-metallic catalyst precursor molecules may be used independently of the seed molecules. Likewise, the seeds molecules may be used with any multi-metallic, mono-metallic or combination of catalyst precursor molecules.

An embodiment of the present invention relates to a method for producing single-wall carbon nanotubes, comprising (a) providing a supercritical fluid catalyst stream comprising (i) a supercritical fluid, (ii) a catalyst precursor selected from the group consisting of multi-metallic catalyst precursors, mono-metallic catalyst precursors, and mixtures thereof that are dissolved, suspended, or both in the fluid, each multi-metallic catalyst precursor comprising at least two atoms, and each mono-metallic catalyst precursor comprising one atom, of at least one transition metal selected from the group consisting of Group VIb elements and Group VIIIb elements, and (iii) a plurality of seed molecules selected from the group consisting of fullerenes, derivatized fullerenes, polycyclic aromatic compounds, derivatized polycyclic aromatic compounds, and mixtures thereof, wherein the supercritical fluid catalyst stream is at a temperature below the decomposition temperature of the catalyst precursor, below the minimum single-wall carbon nanotube formation initiation temperature and below the polymerization temperature of the seed molecule; (b) providing a carbon feedstock gas stream at a temperature above the minimum single-wall carbon nanotube formation initiation temperature; and (c) mixing the carbon feedstock gas stream with the supercritical fluid catalyst stream to form a mixed gas stream, wherein (i) the catalyst precursor reaches a temperature above the decomposition temperature of the catalyst precursor, (ii) the temperature is sufficient to promote the initiation or growth of catalyst clusters, and (iii) the temperature is sufficient to promote the initiation and growth of single-wall carbon nanotubes on the catalyst clusters and on the seed molecules and to form the single-wall carbon nanotubes in the mixed gas stream.

Although it is within the scope of this invention to add the seed molecules into the supercritical fluid catalyst stream, it is preferable for independent control over the addition of each component, to have separate supercritical streams for the multi-metallic catalyst precursors and the seed molecules. The temperature of a supercritical stream containing seed molecules should be below the polymerization temperature of the seed molecule. "Polymerization temperature" means the minimum temperature at which seed molecules undergo bond formation reactions between two or more molecules, thus resulting, either directly or after multiple reactions, in dimers, tetramers, oligomers, or polymers of the seed molecule. Maintaining the temperature of the supercritical fluid catalyst stream below the polymerization temperature of the seed molecule is desirable to retain the seed molecule in a form conducive to its use as a template for single-wall carbon nanotube formation.

Figure 4:
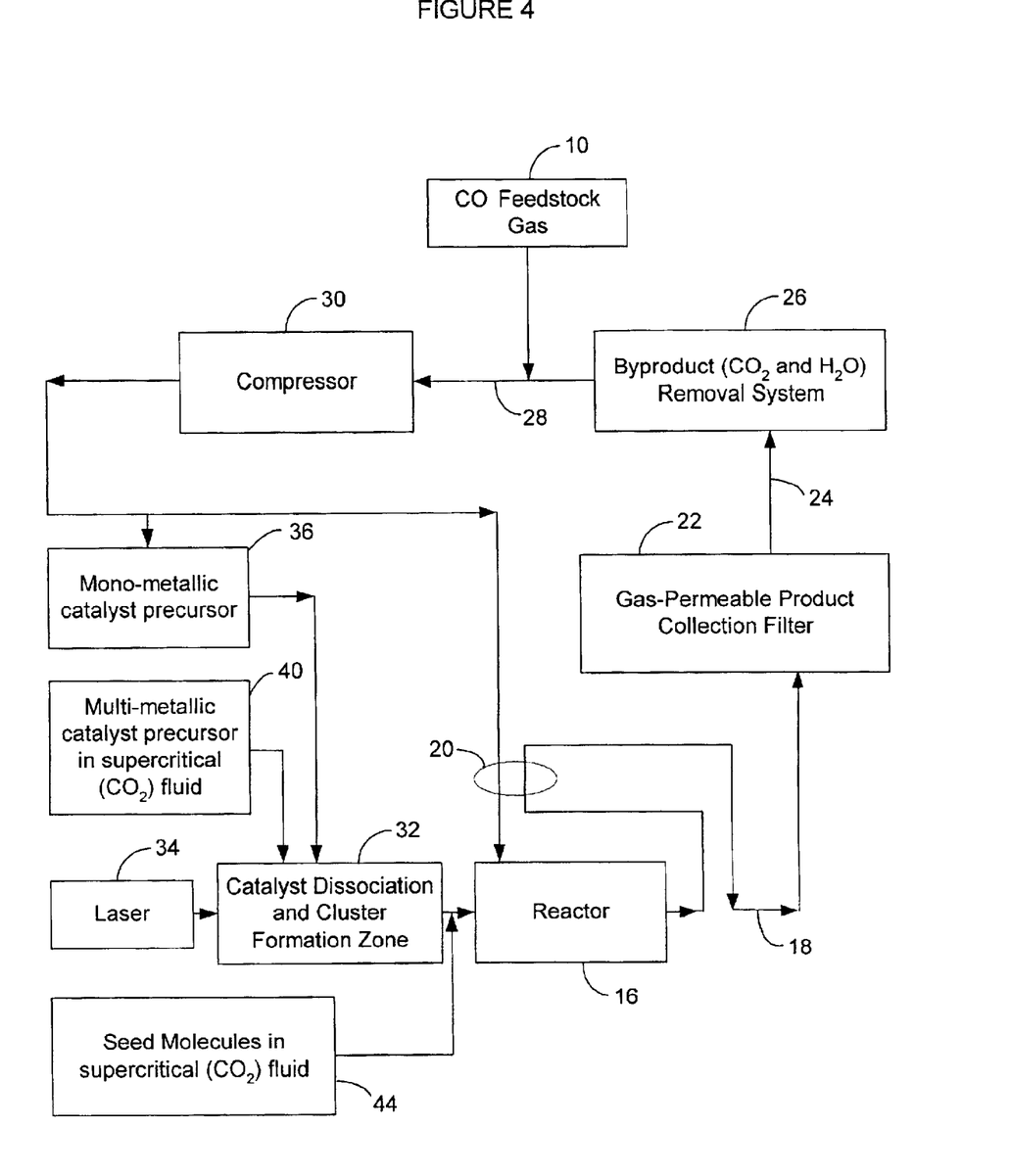
FIG. 4 shows a general schematic of flows in an apparatus for the production of single-wall carbon nanotubes in which multi-metallic catalyst precursor molecules in a supercritical fluid and mono-metallic catalyst precursors are used to make the catalyst clusters and seed molecules in supercritical fluid are used as initiation sites for the growth of single-wall carbon nanotubes.

When there is a separate supercritical fluid catalyst stream and a supercritical fluid seed stream, the streams may be added separately to the reactor to be mixed with the hot carbon-containing feedstock gas for the synthesis of single-wall carbon nanotubes, or, preferably the streams are combined just prior to injection into the reactor. In the case of a separate catalyst stream, any catalyst precursors may be dissociated and clustered prior to injection into the reactor. FIG. 4 illustrates a preferred embodiment. FIG. 4 incorporates all aspects and options of FIG. 3, but also includes the addition of seed molecules in supercritical fluid. In this case, the supercritical fluid seed stream 44 is combined with the supercritical fluid catalyst stream 40 just prior to injection into the reactor. Although not shown in the diagram, it is possible, and desirable, to recycle any recovered $CO_2$ from the byproduct removal system 26, back to into use for dissolving or suspending multi-metallic catalyst precursors in supercritical $CO_2$ fluid or for dissolving or suspending seed molecules in supercritical $CO_2$ fluid.

After the catalyst stream and the seed stream, or the combined stream is injected into the reactor, the streams are mixed with the carbon feedstock gas by any appropriate technique to form the mixed gas stream. The mixed gas stream may be held at a desirable temperature for a sufficient duration to allow the formation of single-wall carbon nanotubes by the catalytic action of the catalyst clusters on the seed molecules and/or on carbon atoms derived from the carbon feedstock gas. The result is a population of molecules comprising single-wall carbon nanotubes in suspension in the mixed gas stream.

In one preferred embodiment, the method further comprises providing a catalyst precursor gas stream at a temperature below the decomposition temperature of the catalyst precursor. This catalyst precursor gas stream may be used as the sole catalyst stream for the synthesis of the nanotubes or combined with the supercritical fluid catalyst stream prior to the reactor and injected together for the synthesis.

Another means for introducing carbon-containing seed molecules is by way of an aerosol or smoke in a carrier gas. One advantage of an aerosol or smoke is the ease and efficiency of introducing the seed molecules in a typical apparatus for performance of the method. The carrier gas for the seed molecules may be CO, $CO_2$, inert gases, small hydrocarbon molecules or mixtures thereof.

This further embodiment of the present invention relates to a method for producing carbon nanotubes, comprising (a) providing a plurality of seed molecules selected from the group consisting of $C_{60}$, $C_{70}$, derivatized $C_{60}$, derivatized $C_{70}$, short length tubular fullerenes, derivatized short length tubular fullerenes, open ended fullerenes, derivatized open ended fullerenes, single-wall carbon nanotubes with pre-attached catalyst particles, polycyclic aromatic compounds, derivatized polycyclic aromatic compounds, and mixtures thereof; (b) creating an aerosol of the seed molecules; (c) providing a fluid catalyst stream comprising a catalyst precursor comprising at least one atom of at least one transition metal selected from the group consisting of Group VIb elements and Group VIIIb elements; (d) providing a carbon feedstock gas stream at a temperature above the minimum single-wall carbon nanotube formation initiation temperature; and (e) mixing the aerosol of the seed molecules, the fluid catalyst stream, and the carbon feedstock gas stream to form a mixed gas stream, wherein (i) the catalyst precursor reaches a temperature above the decomposition temperature of the catalyst precursor, (ii) the temperature is sufficient to promote the initiation or growth of catalyst clusters, and (iii) wherein the temperature is sufficient to promote the initiation and growth of single-wall carbon nanotubes on the catalyst clusters and on the seed molecules and to form the single-wall carbon nanotubes in the mixed gas stream.

A gas stream comprising an aerosol is prepared by the steps comprising selecting one or more carbon-containing nuclei, including $C_{60}$, $C_{70}$, derivatives of $C_{60}$, derivatives of $C_{70}$, polycyclic aromatic compounds, and derivatives of polycyclic aromatic compounds, short length tubular fullerenes, derivatives of short lengths of tubular fullerenes, and single-wall carbon nanotubes with pre-attached catalyst particles. "Short lengths" of tubular fullerenes, both derivatized and underivatized, are carbon nanotubes having lengths of less than about 100 nm. Derivatives of short length tubular fullerenes are short length tubular fullerenes comprising one or more chemical moieties, each bonded to a carbon atom that is a component of the tubular fullerene core. Open-ended fullerenes are carbon nanotubes wherein at least one of the two ends of the tube is not capped by a semifullerene dome. Derivatives of open-ended fullerenes are open-ended fullerenes comprising one or more chemical moieties, each bonded to a carbon atom that is a component of the fullerene core. Single-wall carbon nanotubes with pre-attached catalyst particles are defined as single-wall carbon nanotubes comprising one or more catalyst precursors or catalyst clusters in physical or chemical contact with the single-wall carbon nanotube core, preferably at an open end of the fullerene core.

In one preferred embodiment, the seed molecules are selected from the group consisting of $C_{60}$, $C_{70}$, and mixtures thereof. In another preferred embodiment, the seed molecules are $C_{60}$. In still another preferred embodiment, the open ended fullerenes are fullerenes open at one end. In yet another preferred embodiment, the open-ended fullerenes are fullerenes open at both ends. In a further preferred embodiment, the polycyclic aromatic compound is corannulene.

A gas stream comprising an aerosol of seed molecules may be prepared by any appropriate technique. Preferably, the aerosol or smoke, is created by steps comprising vaporizing the seed molecules in a hot carrier gas; and cooling the vaporized seed molecules in a cool carrier gas, to form the aerosol of seed molecules. More preferably, the hot carrier gas is selected from the group consisting of CO, $CO_2$, methane, argon, nitrogen, and mixtures thereof; and the cool carrier gas is selected from the group consisting of CO, $CO_2$, methane, argon, nitrogen, and mixtures thereof. The hot carrier gas and the cool carrier gas may be the same gas or they may be different gases. Even more preferably, the hot carrier gas is CO and the cool carrier gas is CO.

Regardless of the hot carrier gas and cool carrier gas chosen, preferably, the temperature of hot carrier gas is at least about 500° C. and the pressure of the hot carrier gas is between about 30 atmospheres and 40 atmospheres. Independently and preferably, the temperature of the cool carrier gas is about room temperature.

The seed molecules may be provided to the process at any rate at which the seed molecules will form an aerosol or smoke. In one preferred embodiment, the seed molecules are provided to the process at a rate controlled by the temperature of the hot carrier gas. In another preferred embodiment, the seed molecules are provided to the process at a rate controlled by the temperature of the cool carrier gas.

The fluid catalyst stream comprises one or more catalyst precursors each comprising one or more atoms of at least one transition metal selected from the group consisting of Group VIb elements and Group VIIIb elements, such as listed in previous embodiments. Preferably, the catalyst precursor comprises a metal carbonyl. More preferably, the metal carbonyl is selected from the group consisting of $Fe(CO)_5$, $Ni(CO)_4$, and mixtures thereof. The fluid component of the fluid catalyst stream may be a gas, such as CO, or a supercritical fluid, such as supercritical CO, supercritical $CO_2$, or mixtures thereof.

The carbon feedstock gas stream is supplied at a temperature such that after mixing with any of the other incoming streams is above the minimum temperature required for single-wall carbon nanotube initiation and growth. Preferably, the temperature of the resulting mixed stream is at least 850° C., more preferably above 900° C.

Mixing of the aerosol of the seed molecules, the fluid catalyst stream, and the carbon feedstock gas stream to form a mixed gas stream can be performed by any appropriate technique. The temperature of the mixed gas stream is selected such that any catalyst precursor present reaches a temperature above the decomposition temperature of the catalyst precursor, the temperature is sufficient to promote the initiation or growth of catalyst clusters, and the temperature is sufficient to promote the initiation and growth of carbon nanotubes on the catalyst clusters and on the seed molecules, to form the single-wall carbon nanotubes in suspension in the mixed gas stream.

Preferably, the mixing step comprises mixing the aerosol of seed molecules and the fluid catalyst stream to form a first mixture; and then, mixing the first mixture with the carbon feedstock gas stream to form the mixed gas stream. However, other techniques may be used. The seed molecules may be provided to the mixing step at any rate. Preferably, the seed molecules are provided to the mixing step at a rate controlled by the dilution ratio of the aerosol of seed molecules and the fluid catalyst stream.

The mixed gas stream may be held at a desirable temperature for a sufficient residence time to allow the formation of single-wall carbon nanotubes by the catalytic action of the catalyst clusters on the seed molecules and/or on carbon atoms derived from the carbon feedstock gas. The result is a population of molecules comprising single-wall carbon nanotubes in suspension in the mixed gas stream. The single-wall carbon nanotubes may then be recovered from the mixed gas stream by any appropriate technique, such as with a gas-permeable filter.

Figure 5:
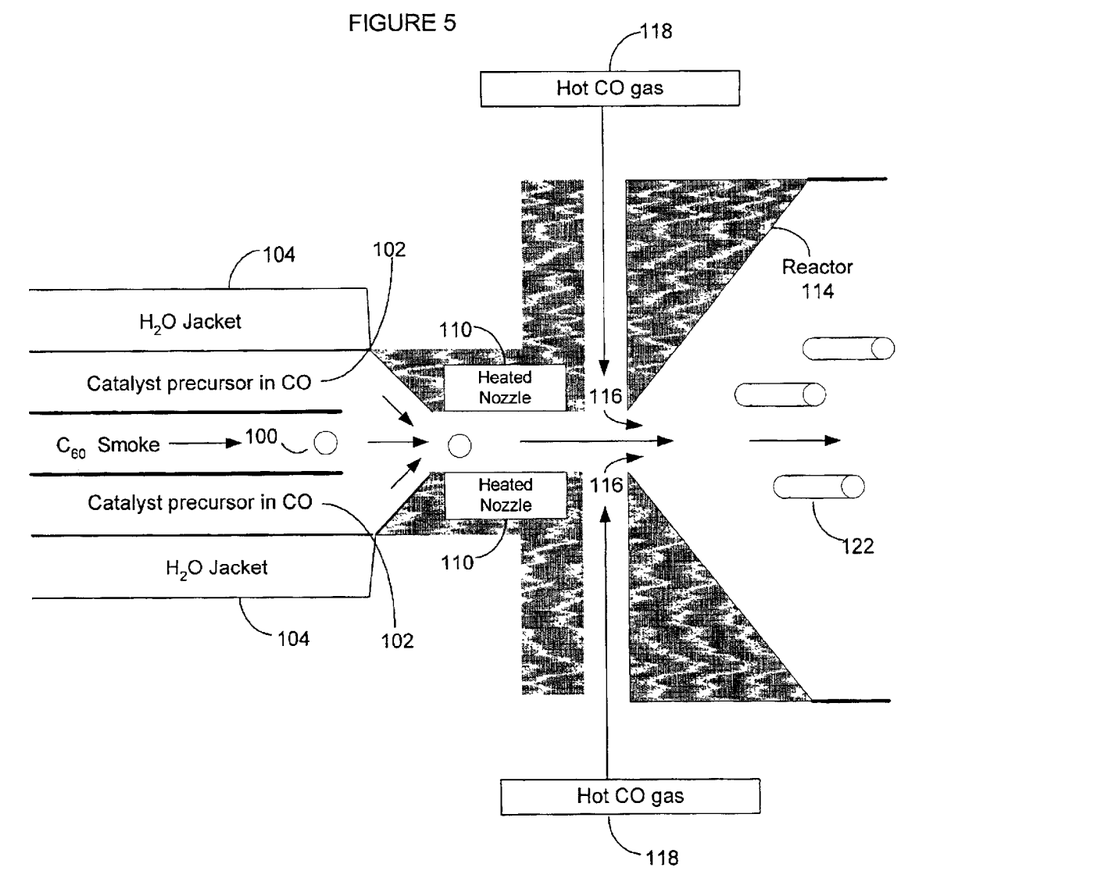
FIG. 5 shows a portion of an apparatus in which an aerosol of carbon-containing "seeds" or "templates" are introduced into the reactor for the growth of single-wall carbon nanotubes.

FIG. 5 shows a portion of an apparatus useful in performing this method. One of ordinary skill in the art will recognize that other apparatus could be used and are within the scope of the invention as presently claimed. A vapor comprising $C_{60}$, with $C_{60}$ being used only by way of example, is formed, cooled, and diluted into a room temperature CO flow (not shown) to form a $C_{60}$ "smoke" (with $C_{60}$ shown as small round balls 100). A second flow 102 comprises CO and a catalyst precursor, examples of which are $Fe(CO)_5$ and $Ni(CO)_4$. The flows 100 and 102 are fed through separate tubes made of any suitable material. Temperature control is provided by a water jacket 104. The apparatus further comprises a heated nozzle 110, reactor 114, and nozzles 116. The flows 100 and 102 are mixed and fed through the heated nozzle to the reactor, where the mixed flows are further mixed with hot CO 118 fed to the reactor through nozzles 116. The reaction then occurs and a suspension of single-wall carbon nanotubes 122 are formed in the in the mixed gas stream.

Figure 6:
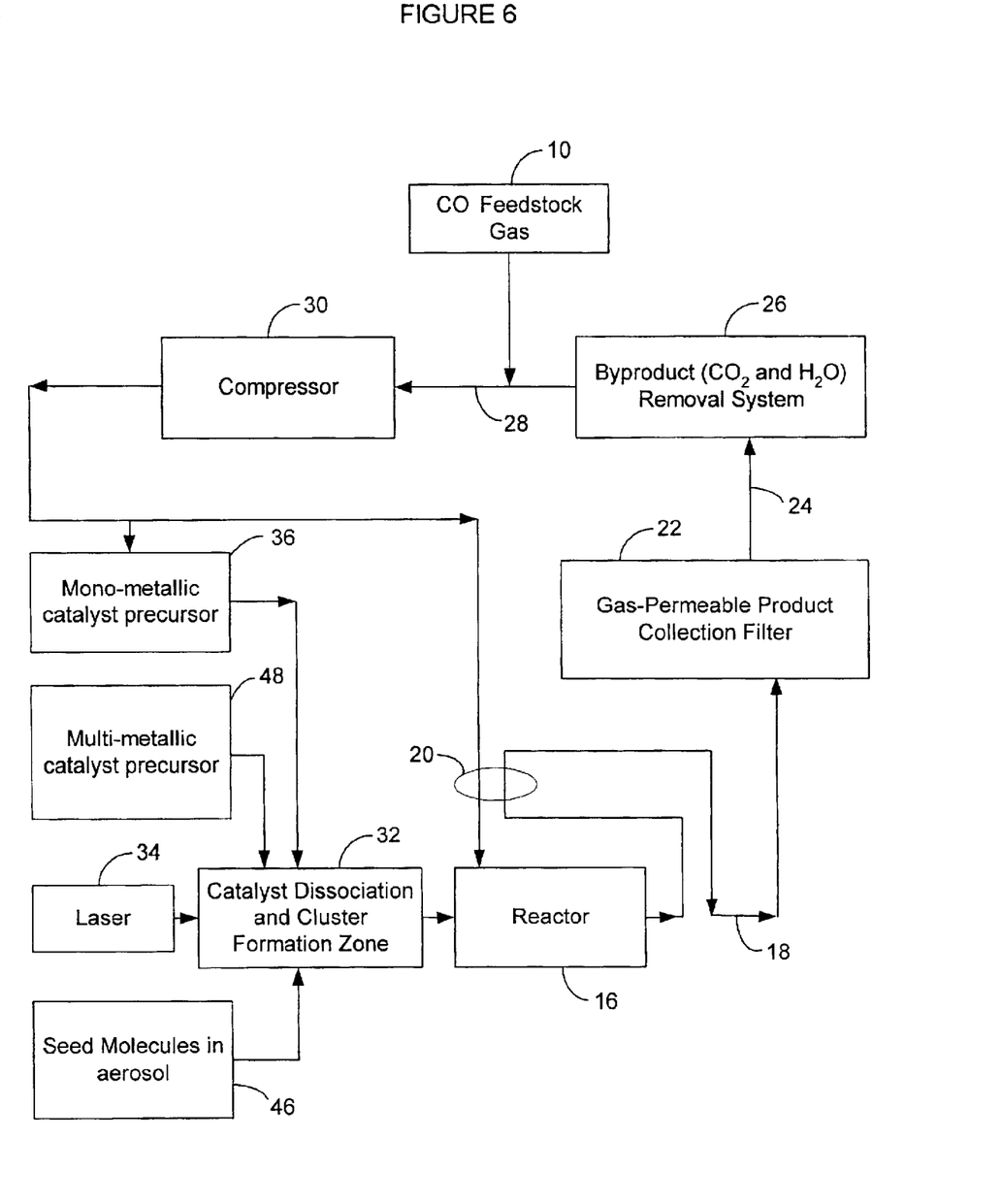
FIG. 6 shows a general schematic of flows in an apparatus for the production of single-wall carbon nanotubes in which catalyst precursor molecules, mono-metallic, multi-metallic, or both, are used to make the catalyst clusters and seed molecules in an aerosol are used as the initiation sites for the growth of single-wall carbon nanotubes.

FIG. 6 shows an illustration of flows of one embodiment of the present invention. This scenario is similar to FIG. 4 except that an aerosol is used for injecting the seeds and non-volatile metal catalyst precursors. In this schematic, a mono-metallic catalyst precursor 36, a multi-metallic catalyst precursor 48, or both, serve as catalyst precursor molecules. The catalyst precursor molecules may be introduced into the catalyst dissociation and cluster zone 32 by either a carrier gas stream or an aerosol gas stream. The catalyst precursor molecules may be dissociated and clusters by heating, by electromagnetic radiation, such as a laser 34, or a combination of both. In this embodiment of the invention, the seed molecules in an aerosol 46, are combined with the catalyst precursors in the catalyst dissociation and cluster zone 32 and then injected into the reactor 40 where single-wall carbon nanotubes grow from the catalyst clusters on the seeds. The remaining portion of the schematic is the same as FIG. 4.

The embodiments of the present invention provide an improved method of producing a single-wall carbon nanotube product comprising single-wall carbon nanotubes with very high purity and homogeneity. The single-wall carbon nanotubes in the product may be separate, grouped in bundles of one or more nanotubes or in the form of ropes, comprising 10 or more nanotubes, wherein the single-wall carbon nanotubes in the bundles or ropes are generally aligned and held together by van der Waals forces. The single-wall carbon nanotubes in the product are of high purity and can be used in many applications without further purification steps. However, for certain applications, purification of the single-wall carbon nanotube product may be performed by techniques known to those of ordinary skill in the art.

The single-wall carbon nanotube product of the present invention contains little, if any, amorphous carbon and contains only minor amounts of catalyst atoms. Generally, the amount of catalyst remaining is less than about 5 to 7 atom %. Preferably, the amount of catalyst is less than about 4 atom %. More preferably, the amount of catalyst is less than about 2 atom %.

The present invention provides for a single-wall carbon nanotube product which comprises mostly single-wall carbon nanotubes and only minor amounts of other carbon species, such as amorphous carbon and other graphitic carbon forms. Of all the carbon atoms in the carbon nanotube product of the present invention, it is feasible that at least about 90% of the carbon atoms can be in the form of single-wall carbon nanotubes. Preferably, at least about 95% of the carbon atoms in the nanotube product are in the form of single-wall carbon nanotubes. More preferably, at least about 99% of the carbon atoms in the nanotube product are in the form of single-wall carbon nanotubes.

One of the advantages of the present invention is that there is a high level of control over the diameter and conformation of the single-wall carbon nanotubes produced. This diameter and conformation control is predominantly due to the homogeneity of the catalyst clusters supplied to the reaction zone and/or the use of carbon-containing seed molecules. The diameter and conformation of the single-wall carbon nanotubes produced can be generally in the size and type desired. In general, single-wall carbon nanotube diameters are in the range of about 0.6 nm to about 3 nm. The preferred diameter range of the single-wall carbon nanotubes produced is dependent on the application of use. The single-wall carbon nanotubes may possess any possible conformation or geometry, e.g. armchair, zigzag, or others. The preferred conformation or geometry is dependent on the application of use. The length of the single-wall carbon nanotubes is highly dependent upon the residence time, temperature, pressure, and other parameters in the reactor for nanotube production. The preferred length of the single-wall carbon nanotubes is also dependent on the application of use.

The carbon nanotubes produced may be used for any application known to one of ordinary skill in the art. Such applications include, but are not limited to, electrical connectors in microdevices (e.g., integrated circuits or semiconductor chips), antennas, optical antennas, probes for scanning tunneling microscopy (STM) or atomic force microscopy (AFM), additive to or substitute for carbon black (in, e.g., motor vehicle tires), catalysts in industrial and chemical processes, power transmission cables, solar cells, batteries, molecular electronics, probes, manipulators, and composites, among others.

All of the compositions and methods disclosed and claimed herein can be made and executed without undue experimentation in light of the present disclosure. While the compositions and methods of this invention have been described in terms of preferred embodiments, it will be apparent to those of skill in the art that variations may be applied to the compositions and methods and in the steps or in the sequence of steps of the method described herein without departing from the concept, spirit and scope of the invention. More specifically, it will be apparent that certain agents which are both chemically and physiologically related may be substituted for the agents described herein while the same or similar results would be achieved. All such similar substitutes and modifications apparent to those skilled in the art are deemed to be within the spirit, scope and concept of the invention as defined by the appended claims.

What is claimed is:

1. A method for producing single-wall carbon nanotubes, comprising:
   (a) providing a supercritical fluid catalyst stream comprising
      (i) a supercritical fluid and
      (ii) a catalyst precursor selected from the group consisting of multi-metallic catalyst precursors, mono-metallic catalyst precursors, and mixtures thereof that are dissolved, suspended, or both in the fluid, each multi-metallic catalyst precursor comprising at least two atoms, and each mono-metallic catalyst precursor comprising one atom, of at least one transition metal selected from the group consisting of Group VIb elements and Group VIIIb elements, wherein the supercritical fluid catalyst stream is at a temperature below the decomposition temperature of the catalyst precursor;
   (b) providing a carbon feedstock gas stream at a temperature above the minimum single-wall carbon nanotube formation initiation temperature; and
   (c) mixing the carbon feedstock gas stream with the supercritical fluid catalyst stream to form a mixed gas stream, wherein the carbon feedstock gas stream heats the mixed gas stream and wherein without the need for additional heating
      (i) the catalyst precursor in the mixed gas stream will reach a temperature above the decomposition temperature of the catalyst precursor,
      (ii) the temperature of the mixed gas stream is sufficient to promote the initiation or growth of catalyst clusters, and
      (iii) the temperature of the mixed gas stream is sufficient to promote the initiation and growth of single-wall carbon nanotubes on the catalyst clusters and to form the single-wall carbon nanotubes in the mixed gas stream.

2. The method of claim 1, wherein the supercritical fluid comprises a compound selected from the group consisting of $CO_2$, CO, and mixtures thereof.

3. The method of claim 2, wherein the supercritical fluid comprises $CO_2$, and wherein $P_{CO_2}$ is at least about 73 atm.

4. The method of claim 1, wherein the multi-metallic catalyst precursor comprises a multimetal carbonyl.

5. The method of claim 4, wherein the multimetal carbonyl is selected from the group consisting of $Fe_2(CO)_9$, $Fe_3(CO)_{12}$, $Fe_4C(CO)_{13}$, $Fe_5C(CO)_{15}$, $Ru_4C(CO)_{13}$, $Ru_5C(CO)_{15}$, $Ru_6C(CO)_{17}$, $Os_5C(CO)_{15}$, and mixtures thereof.

6. The method of claim 1, wherein the carbon feedstock gas is selected from the group consisting of CO, methane, and mixtures thereof.

7. The method of claim 6, wherein the carbon feedstock gas stream comprises CO, wherein $P_{CO}$ is from about 3 atm to about 1000 atm.

8. The method of claim 1, wherein the temperature of the mixed gas stream is at least about 850° C.

9. The method of claim 1, wherein the temperature of the mixed gas stream is at least about 900° C.

10. The method of claim 1, further comprising recovering a single-wall carbon nanotube product from the mixed gas stream.

11. The method of claim 10, wherein the recovering step comprises passing the mixed gas stream through a gas-permeable filter.

12. The method of claim 10, wherein at least about 90% of the carbon in the single-wall carbon nanotube product is single-wall carbon nanotubes.

13. The method of claim 10, wherein at least about 95% of the carbon in the single-wall carbon nanotube product is single-wall carbon nanotubes.

14. The method of claim 10, wherein at least about 99% of the carbon in the single-wall carbon nanotube product is single-wall carbon nanotubes.

15. The method of claim 10, wherein less than about 7 atom % of the single-wall carbon nanotube product is metal catalyst.

16. The method of claim 10, wherein less than about 4 atom % of the single-wall carbon nanotube product is metal catalyst.

17. The method of claim 10, wherein less than about 2 atom % of the single-wall carbon nanotube product is metal catalyst.

18. The method of claim 1, wherein the mono-metallic catalyst precursor comprises a metal carbonyl.

19. The method of claim 18, wherein the metal carbonyl is selected from the group consisting of $Fe(CO)_5$, $Ni(CO)_4$, and mixtures thereof.

20. The method of claim 1, further comprising mixing the supercritical fluid catalyst stream with a heating gas stream, wherein the supercritical fluid catalyst stream is heated to a temperature above the decomposition temperature of the catalyst precursor and sufficient to promote the initiation and growth of catalyst clusters and to form a supercritical fluid catalyst stream comprising a solution or suspension of catalyst clusters.

21. The method of claim 20, wherein the heating gas stream comprises a gas selected from the group consisting of CO, argon, nitrogen, and mixtures thereof.

22. The method of claim 20, wherein the temperature of the supercritical fluid catalyst stream comprising a suspension of catalyst clusters is at least about 850°° C.

23. The method of claim 20, wherein the temperature of the supercritical fluid catalyst stream comprising a suspension of catalyst clusters is at least about 900° C.

24. The method of claim 1, further comprising subjecting the supercritical fluid catalyst stream to substantially coherent substantially monochromatic electromagnetic radiation, wherein the substantially coherent substantially monochromatic electromagnetic radiation provides sufficient energy to dissociate nonmetal atoms from the catalyst precursor and promote the initiation and growth of catalyst clusters, to form a supercritical fluid catalyst stream comprising a solution or a suspension of catalyst clusters.

25. The method of claim 24, wherein the substantially coherent substantially monochromatic electromagnetic radiation has a peak wavelength of about 200 nm to about 300 nm.

26. A method for producing single-wall carbon nanotubes, comprising:
  (a) providing a catalyst stream comprising a catalyst precursor, wherein
    (i) the catalyst precursor comprises a multi-metallic catalyst precursor dissolved, suspended, or both in the catalyst stream,
    (ii) the multi-metallic catalyst precursor comprises at least two atoms of at least one transition metal selected from the group consisting of Group VIb elements and Group VIIIb elements, and
    (iii) the catalyst stream is at a temperature below the decomposition temperature of the multi-metallic catalyst precursor;
  (b) providing a carbon feedstock gas stream at a temperature above the minimum single-wall carbon nanotube formation initiation temperature; and
  (c) mixing the carbon feedstock gas stream with the catalyst stream to form a mixed gas stream, wherein the carbon feedstock gas stream heats the mixed gas stream and wherein without the need for additional heating
    (i) the multi-metallic catalyst precursor in the mixed gas stream will reach a temperature above the decomposition temperature of the multi-metallic catalyst precursor,
    (ii) the temperature of the mixed gas stream is sufficient to promote the initiation or growth of catalyst clusters, and
    (iii) the temperature of the mixed gas stream is sufficient to promote the initiation and growth of single-wall carbon nanotubes on the catalyst clusters and to form the single-wall carbon nanotubes in the mixed gas stream.

27. The method of claim 26, wherein the catalyst stream further comprises a mono-metallic catalyst precursor, wherein the mono-metallic catalyst precursor comprises one atom of a transition metal selected from the group consisting of Group VIb elements and Group VIIIb elements, and the catalyst stream is at a temperature below the decomposition temperature of the mono-metallic catalyst precursor.

* * * * *